United States Patent
Ishihara

(10) Patent No.: US 6,803,403 B2
(45) Date of Patent: Oct. 12, 2004

(54) POLYMER EMULSION

(75) Inventor: Takamasa Ishihara, Takatsuki (JP)

(73) Assignee: Shinto Fine Co., Ltd., Osaka (JP)

( * ) Notice: Subject to any disclaimer, the term of this patent is extended or adjusted under 35 U.S.C. 154(b) by 239 days.

(21) Appl. No.: 10/084,377

(22) Filed: Feb. 28, 2002

(65) Prior Publication Data

US 2002/0169250 A1 Nov. 14, 2002

(30) Foreign Application Priority Data

Mar. 2, 2001 (JP) .......................... 2001-057609

(51) Int. Cl.$^7$ .............. C08J 3/00; C08J 3/02; C08K 3/20; C08L 33/00; C08L 27/00
(52) U.S. Cl. ............ 524/501; 524/502; 524/515; 524/523; 524/524; 524/525; 524/526; 524/527
(58) Field of Search ................. 524/501, 502, 524/515, 523, 524, 525, 526, 527

(56) References Cited

U.S. PATENT DOCUMENTS 4,812,327 A 3/1989 Hanazawa et al.
5,082,895 A * 1/1992 Wolff et al. ................. 524/820

FOREIGN PATENT DOCUMENTS

| EP | 0 236 879 A2 | 9/1987 |
| EP | 0 331 143 A2 | 9/1989 |
| JP | 11-106442 | 4/1999 |
| WO | WO 96/19536 | 6/1996 |
| WO | WO 01/38412 A1 | 5/2001 |

* cited by examiner

*Primary Examiner*—Patrick D. Niland
(74) *Attorney, Agent, or Firm*—Birch, Stewart, Kolasch & Birch, LLP

(57) ABSTRACT

A polymer emulsion with good film forming property, which is mixed a synthetic polymer emulsion containing the polymer having the particle size of 0.15 μm or longer in diameter and a synthetic polymer emulsion containing the polymer having particle size of 0.10 μm or shorter in diameter, wherein the glass transition temperature of the latter polymer is at least 20 degree lower than that of the former emulsion and the particle size ratio between the former polymer and the latter polymer is 2 or more. The polymer emulsion is used for making moisture-proof coated paper and/or recyclable-coated paper.

5 Claims, No Drawings

POLYMER EMULSION

This invention relates to synthetic polymer emulsion, and particularly, this invention relates to a composition comprising mixed synthetic polymer emulsion which possesses good film forming property.

The film forming mechanism of various kinds of synthetic polymer emulsion has been widely studied, and it is known that the film formation of polymer emulsion occurs the following process. Under the temperature higher than glass transition temperature, polymer particles change their shape and coalesce each other by vaporizing water contained in emulsion. But in order to make perfect film formation, this process needs at least a few days. Under higher temperature than glass transition temperature and short time drying like industrial process, film formation partially occurs and does not give their good properties. Difficulty of short time drying causes limited various applications of synthetic polymer emulsion.

In order to solve the above problem, coalescent agents those are vaporizable solvent existing in water or polymer particles are used to make glass transition temperature (hereinafter referred to as Tg) of polymer lower temporarily. However, this method is not suitable for air pollution problem.

To improve film formation, fine particle emulsion polymers those have strong capillary pressure in coalescence are commonly used. But it needs much surfactant to produce such fine particle emulsion. Generally using much surfactant is incident to produce polymer having poor water resistance.

Another method to improve film formation is using the mixture of higher Tg polymer emulsion and lower Tg polymer emulsion. But the mixture has sharp change of film forming temperature and must contain much lower Tg polymer emulsion making their film tacky to keep enough film formation. Such tackiness may happen blocking problem of products.

As the result, it is very difficult to get polymer emulsion or compounds those have higher Tg, good film formation at low temperature or short time drying and good blocking resistance.

Especially preventing moisture transparent coatings for pulp paper or sheet that needs good film formation under the forced drying process during short period and at low temperature is one of the most difficult matters.

In this field, the polymer emulsion containing low Tg polymer with good film forming property, must contain much inorganic fillers or pigments and waxes to prevent blocking.

The present invention is based upon making polymer emulsion having good film forming property under low temperature and/or forced short time dying without vaporizable organic solvents that promotes the change of particle shape and coalescence.

The inventor has conducted extensive researches about coagulations and absorptions concerning emulsion polymer particles.

As the result, the inventor found that the mixtures of emulsion polymers which have specific particle size range and different Tg, adsorb each other and develop good film forming properties. The polymer emulsion is used for making moisture-proof coated paper and/or recyclable-coated paper.

In order to obtain the polymer emulsion of the present invention, stable and fine particle emulsion polymers with Tg of 20 degree (° C.) lower than that of the desired emulsion composition should be prepared. The particle size of the emulsion polymers should be 0.10 $\mu$m or shorter in diameter, preferably 0.03 to 0.09 $\mu$m. Hereinafter, such polymer emulsion is referred to as the fine particle emulsion.

Further, an emulsion containing the polymer of a desired Tg has the particle size of 0.15 $\mu$m or longer in diameter and preferably more than 2 times in diameter of the fine particle and improved film forming emulsion is produced by adjusting an amount of an emulsifier in emulsion polymerization. Hereinafter, such emulsion polymer is referred to as the large particle emulsion.

When emulsion polymerization of the large particle emulsion is finished or in proceeding, the fine particle and improved film forming emulsion is added to a reactor for making mixture. In above process for obtaining the polymer emulsion of the present invention, the fine particle portion of the fine particle emulsion may be decreased or disappeared by checking particle distribution. The mixture of the fine particle emulsion and the large particle emulsion may be partially reacted.

In order to obtain the polymer emulsion of the present invention, the particle size of the large particle emulsion is important and should be 0.15 $\mu$m or longer in diameter. If emulsion polymerization formula and condition of the large particle emulsion are selected to produce particle size of smaller than 0.15 $\mu$m, the emulsions produced are too stable to absorb the fine particle and improved film forming emulsion, and do not have good film forming property. Also the particle size of the fine particle emulsion is important and should be 0.1 $\mu$m or shorter in diameter. If the emulsions with the particle size of 0.1 $\mu$m or longer in diameter are selected, the emulsions produced cannot absorb the fine particle.

The particle size or diameter means volume median diameter and can be measured by laser scattering particle size analyzer throughout this specification and claims.

In order to obtain the polymer emulsion having good film-forming property, the particle size ratio between particle size of the large particle emulsion and the particle size of the fine particle emulsion is preferably 2 or more. In case the particle size ratio is smaller than 2, each of the large particle emulsion and the fine particle emulsion tends to exist independently. As the result, such mixture may not show improved film-forming property.

In order to obtain the polymer emulsion having good film-forming property, mixture ratio between the solid content of the desired and large particle emulsion and the solid content of the fine particle emulsion is preferably 50:50 to 95:5.

In case the mixture ratio of the fine particle emulsion is larger than 50%, the composition may be the mixture of absorbed particle emulsion and the fine particle emulsion. As the result, the polymer emulsion may have poor blocking resistance. If the mixture ratio is smaller than 5%, the composition may be unstable and may not show improved film-forming property.

Hereinafter, the present invention is mentioned in detail.

The polymer emulsion of the present invention is used for application on various purposes needing good film-forming and blocking resistance by high Tg and good film-forming property.

Synthetic emulsion polymer of the fine particle emulsion or the large particle emulsion generally means emulsion polymer that is made by emulsion polymerization with one or more monomers that have radically reactive groups. Examples of the emulsion polymers include styrene-butadiene emulsion (latex), acrylic emulsion, vinyl-acetate emulsion etc. in the present invention. Monomers that have radically reactive groups are chemical substances that contain vinyl groups in their molecular and are made industrially.

Synthetic emulsion polymer in the present invention is prepared by widely known emulsion polymerization method. There are many published literatures about emulsion polymerization method, for example, "Emulsion Latex Handbook" that was published by Taiseisha Co., Ltd. Generally the emulsion polymers are prepared by reacting the radically reactive monomers mentioned above in water medium that contain an emulsifier and a water-soluble radical initiator. Examples of the emulsifier include surfactants such as alkylbenzenesulfonates (e.g. sodium dodecylbenzenesulfonate), dialkyl sulfosuccinates(e.g. sodium dodecylsulfosuccinate) and polyoxyethylene alkylphenyl ether sulfates (e.g. sodium polyoxyethylene alkylphenyl ethoxy sulfate). Examples of the water-soluble radical initiator include persulfates (e.g. ammonium persulfate) and water soluble hydroperoxide(e.g. t-butyl hydroperoxide).

The polymer emulsion of the present invention has good film forming property, and can be produced by mixing the fine particle emulsion and the large particle emulsion.

The fine particle emulsion is the emulsion having particle of 0.1 $\mu$m or shorter in diameter. This emulsion is generally produced by polymerization of one or more radically reactive monomers in water medium that contain an emulsifier at 0.5% to 5% by weight based on the total amount of monomer and water-soluble radical initiator. Anionic surfactants those include anionic groups (e.g. sulfonate, sulfate, carboxylate) in molecular are preferably used as the emulsifiers mentioned above.

Monomers those contain ionic groups in molecular is used in emulsion polymerization cooperate with other monomers.

As the fine particle emulsion used in this invention, fine particle emulsions having particle size of smaller than 0.1 $\mu$m in diameter from various kinds of emulsion polymer products commercially available that are stable chemically and mechanically and good stability for storage.

The particle size of the polymer in the fine particle emulsion depends on the particle size of the polymer in the large particle emulsion in this invention. The particle size ratio between the large particle emulsion and the fine particle emulsion should be 2 or more. If the ratio is less than 2, the polymer emulsion does not have good film formation property.

The fine particle emulsion comprises polymers having the large particle size of 0.10 $\mu$m or shorter in diameter. It usually comprises 30–60% of a polymer, 0.2–6% of an emulsifier and 35–68% of water.

Further, the large particle emulsion comprises polymers having the large particle size of 0.15 $\mu$m or longer in diameter. It usually comprises 40–60% of a polymer, 0.1–4% of an emulsifier and 35–58% of water.

The large particle emulsion that has the particle size of 0.15 $\mu$m or longer in diameter is prepared by known emulsion polymerization process with a small amount of emulsifiers. Namely, the size of the particle in the emulsion can be adjusted by the amount of the emulsifier, though the kind and the quantity of emulsifiers depend on the conditions of polymerization like temperature, monomer concentration in polymerization, composition of monomer, solid content of product, etc.

When the large particle emulsion is prepared by using a small amount of emulsifiers, the obtained emulsion is generally unstable in storage, chemically and mechanically and does not tolerate in industrial process. It is marvelous that such large particle emulsion obtained in this invention changes to be stable in storage, chemically and mechanically and has good film forming property and also tolerates in industrial process.

The simple method of producing emulsion composition with good film forming property in the present invention is simply mixing the fine particle emulsion with the large particle emulsion. In order to produce more effective emulsion, it is suitable to add the fine particle emulsion to reactor mass of polymerization of the large particle emulsion when polymerization of the large particle emulsion has finished or all most of monomers are converted to polymer.

Also it is suitable to add the fine particle emulsion to reactor mass of polymerization of the large particle emulsion when residual monomer is still existing. In this case, grafting between large particle and fine particle may occur as same as absorption.

In order to obtain the polymer emulsion of the present invention, the mixing ratio between the polymer content of the large particle emulsion and the polymer content of the fine particle emulsion, is preferably 50:50 to 95:5, more preferably 70:30 to 90:10.

In case the mixture ratio of the fine particle emulsion is larger than 50% by weight, the composition will be the mixture of absorbed particle emulsion and the small particle emulsion. As the result, the composition may have poor blocking resistance. If the mixing ratio is smaller than 5%, the composition will be unstable and have not improved the film-forming property.

Method to know the polymer emulsion with good film forming property in the present invention is observing particle distribution of diluted emulsion freeze-dried by an electron microscope.

Another simple method is comparing particle size distribution with mixed product and raw material emulsion by a laser scattering particle size analyzer.

It is identified that the emulsion composition in this invention is the disappearance and/or the decrease of small particle portions contributed to the fine particle emulsion.

The polymer emulsion of the present invention can be used for producing paper coating composition for making moisture-proof coated paper and/or recyclable-coated paper. The paper coating composition comprises the polymer emulsion, a wax and optionally other ingredients. In the present paper coating composition, the content of the polymer emulsion is usually 60 to 99.5% by weight and the content of the wax is usually 0.2 to 20% by weight.

The wax used in the present invention means water-proof solid substances having 50 to 90° C. melting point, becoming liquid phase in the temperature above melting point and containing crystalline structure in solid phase. Examples of the wax include natural waxes such as mineral waxes (e.g. paraffin wax); plant waxes (e.g. carnauba wax) and animal waxes (e.g. bee wax, spermaceti), and synthetic waxes such as polyethylene wax.

The content of the other ingredients (e.g. pigments, filler, water soluble polymers, surfactants and etc.) is usually 0 to 30% by weight.

This invention will be explained concretely by the following examples and comparative examples, which are given by way of illustration but not for the limitation of the scope of the invention. All formulations given in examples and comparative examples herein are specified on a weight basis.

Example A-1 (Fine Particle Emulsion)

Charge A-1)

A vessel equipped with a stirrer was charged with the mixture of 26.5 parts of styrene, 62 parts of 2-ethylhexyl acrylate, 11.5 parts of methacrylic acid, 2 parts of sodium dodecylbenzenesulfonate and 54.9 parts of deionized water. The mixture was emulsified by stirring.

A reactor vessel equipped with a thermometer, a stirrer, a blanket nitrogen intake line, a monomer feed pump and a reflux condenser was charged with 33.6 parts of deionized water, 0.5 parts of sodium dodecylbenzenesulfonate. The mixture was heated under nitrogen blanket to 75° C., then 20 parts of 10% ammonium persulfate in deionized water was added and was kept for 10 minutes. Charge A-1 was added, with stirring, for four hours while keeping inner temperature 73 to 78° C. After Adding Charge A-1, the reactor was heated to 80° C. and kept for 2 hours, then cooled to room temperature and 2.5 parts of 25% aqueous ammonia solution was added.

The resulting emulsion polymer had 49.1% solid content, 1500 mPa.s in viscosity, pH 7.6, Tg −26° C., 0.09 μm in particle size and it was mechanically stable.

Example A-2 (Comparative Example)

Charge A-2)

A vessel equipped with a stirrer was charged with the mixture of 26.5 parts of styrene, 62 parts of 2-ethylhexyl acrylate, 11.5 parts of methacrylic acid, 1.5 parts of sodium dodecylbenzenesulfonate and 54.9 parts of deionized water. The mixture was emulsified by stirring.

A reactor vessel equipped with a thermometer, a stirrer, a blanket nitrogen intake line, a monomer feed pump and a reflux condenser was charged with 33.6 parts of deionized water, 0.5 parts of sodium dodecylbenzenesulfonate. The mixture was heated under nitrogen blanket to 75° C., then 20 parts of 10% ammonium persulfate in deionized water was added and was kept for 10 minutes. Charge A-2 was added, with stirring, for four hours while keeping inner temperature 73 to 78° C. After adding Charge A-2, the reactor was heated to 80° C. and kept for 2 hours then cooled to room temperature and 2.5 parts of 25% aqueous ammonia solution was added. The resulting emulsion polymer had 49.2% solid content, 120 mPa.s in viscosity, pH 7.6, Tg −26° C., 0.2 μm in particle size and it was mechanically stable.

Example B-1 (Desired and Large Particle Emulsion)

Charge B-1)

A vessel equipped with a stirrer was charged with the mixture of 62 parts of styrene, 34.5 parts of 2-ethylhexyl acrylate, 3.5 parts of methacrylic acid, 0.5 parts of sodium dodecylbenzenesulfonate and 60 parts of deionized water. The mixture was emulsified by stirring.

A reactor vessel equipped with a thermometer, a stirrer, a blanket nitrogen intake line, a monomer feed pump and a reflux condenser was charged with 40 parts of deionized water. The mixture was heated under nitrogen blanket to 75° C., then 20 parts of 10% ammonium persulfate in deionized water was added and was kept for 10 minutes. Charge B-1 was added, with stirring, for four hours while keeping inner temperature 73 to 78° C. After adding Charge B-1, the reactor was heated to 80° C. and kept for 2 hours, then cooled to room temperature and 1.5 parts of 25% aqueous ammonia solution was added.

The resulting emulsion polymer had 45.6% solid content, 130 mPa.s in viscosity, pH 7.6, Tg 17° C., 0.25 μm in particle size. When this emulsion was diluted to 15% solid and kept for 1 week, it showed the gradient of concentration and seemed unstable. This emulsion was also mechanically unstable as it had 800 ppm grits after the mechanical stable test.

Example B-2 (Desired and Large Particle Emulsion)

Charge B-2)

A vessel equipped with a stirrer was charged with the mixture of 70 parts of styrene, 26.5 parts of 2-ethylhexyl acrylate, 3.5 parts of methacrylic acid, 0.5 parts of sodium dodecylbenzenesulfonate and 60 parts of deionized water. The mixture was emulsified by stirring.

A reactor vessel equipped with a thermometer, a stirrer, a blanket nitrogen intake line, a monomer feed pump and a reflux condenser was charged with 40 parts of deionized water. The mixture was heated under nitrogen blanket to 75° C., then 20 parts of 10% ammonium persulfate in de-ionized water was added and was kept for 10 minutes. Charge B-2 was added, with stirring, for four hours while keeping inner temperature 73 to 78° C. After adding Charge B-2, the reactor was heated to 80° C. and kept for 2 hours, then cooled to room temperature and 1.5 parts of 25% ammonium aqueous solution was added.

The resulting emulsion polymer had 45.6% solid content, 110 mPa.s in viscosity, pH 8.6, Tg 33.5° C., 0.30 μm in particle size. When this emulsion was diluted to 15% solid and kept for 1 week, it showed the gradient of concentration and seemed unstable. This emulsion was also mechanically unstable as it had 1000 ppm grits after the mechanical stable test.

Example C-1 (Comparative Example)

Charge C-1)

A vessel equipped with a stirrer was charged with the mixture of 62 parts of styrene, 34.5 parts of 2-ethylhexyl acrylate, 3.5 parts of methacrylic acid, 1.5 parts of sodium dodecylbenzenesulfonate and 60 parts of deionized water. The mixture was emulsified by stirring.

A reactor vessel equipped with a thermometer, a stirrer, a blanket nitrogen intake line, a monomer feed pump and a reflux condenser was charged with 40 parts of deionized water. The mixture was heated under nitrogen blanket to 75° C., then 20 parts of 10% ammonium persulfate in deionized water was added and was kept for 10 minutes. Charge C-1 was added, with stirring, for four hours while keeping inner temperature 73 to 78° C. After adding Charge C-1, the reactor was heated to 80° C. and kept for 2 hours, then cooled to room temperature and 1.5 parts of 25% aqueous ammonia solution was added.

The resulting emulsion polymer had 45.7% solid content, 170 mPa.s in viscosity, pH 8.4, Tg 17° C., 0.11 μm in particle size. When this emulsion was diluted to 15% solid and kept for 1 week, it had no gradient of concentration and seemed stable. It had 500 ppm grits after the mechanical stable test.

Example C-2 (Comparative Example)

Charge C-2)

A vessel equipped with a stirrer was charged with the mixture of 70 parts of styrene, 26.5 parts of 2-ethylhexyl acrylate, 3.5 parts of methacrylic acid, 1.5 parts of sodium dodecylbenzenesulfonate and 60 parts of deionized water. The mixture was emulsified by stirring.

A reactor vessel equipped with a thermometer, a stirrer, a blanket nitrogen intake line, a monomer feed pump and a reflux condenser was charged with 40 parts of deionized water. The mixture was heated under nitrogen blanket to 75° C., then 20 parts of 10% ammonium persulfate in deionized water was added and was kept for 10 minutes. Charge C-2 was added, with stirring, for four hours while keeping inner temperature 73 to 78° C. After adding Charge C-2, the reactor was heated to 80° C. and kept for 2 hours, then cooled to room temperature and 1.5 parts of 25% aqueous ammonia solution was added.

The resulting emulsion polymer had 45.8% solid content, 150 mPa.s in viscosity, pH 8.5, Tg 33.5° C., 0.12 μm in particle size. When this emulsion was diluted to 15% solid and kept for 1 week, it had no gradient of concentration and seemed stable. It had 500 ppm grits after the mechanical stable test.

EXAMPLE 1

A reactor vessel equipped with a thermometer, a stirrer, an emulsion feed pump and a reflux condenser was charged with 70 parts of Example B-1. Stable SBR latex JSR 0569 (solid content 48%, 0.09 μm in particle size, Tg –4° C.. commercially available from Japan Synthetic Rubber Co., Ltd.) with a fine particle size was added, with stirring, for 15 minutes at 40° C., then continue to stir for 30 minutes.

This mixture had a simple 0.26 μm peak in particle distribution and no fine particle portion contributed to SBR latex JSR 0569 was found.

When this composition was diluted to 15% solid and kept for 1 week, it had no gradient of concentration and seemed stable. The mechanical stability of this composition was examined by the mechanical stable test.

The film forming property of this composition was examined by the grade of pin-hole and the vapor transition when it was coated to usual PPC paper (75 g/m.sqr) at the rate of 15 g/m.sqr by a wire bar and dried for 1 minute at 130° C.

Test result was shown in Table 1.

EXAMPLE 2

A reactor vessel equipped with a thermometer, a stirrer, an emulsion feed pump and a reflux condenser was charged with 90 parts of Example B-1. Stable SBR latex Luxstar DS-602 (solid content 48% 0.09 μm in particle size, Tg –24° C., commercially available from Dainippon Ink and Chemicals, Inc.) with fine particle size was added, with stirring, for 15 minutes at 40° C., then continued to stir for 30 minutes.

This mixture had a simple 260 μm peak in particle distribution and no fine particle portion contributed to SBR latex Luxstar DS-602 was found.

When this composition was diluted to 15% solid and kept for 1 week, it had no gradient of concentration and seemed stable.

This composition was tested as the same way of Example 1.

Test result was shown in Table I.

EXAMPLE 3

A reactor vessel equipped with a thermometer, a stirrer, an emulsion feed pump and a reflux condenser was charged with 90 parts of Example B-1. Stable styrene-acrylic emulsion of Example A-1 in this invention was added, with stirring, for 15 minutes at 40° C., then continued to stir for 30 minutes.

This mixture had a simple 0.26 μm peak in particle distribution and no fine particle portion contributed to Example A-1 was found.

When this composition was diluted to 15% solid and kept for 1 week, it had no gradient of concentration and seemed stable.

This composition was tested as the same way of Example 1.

Test result was shown in Table 1.

TABLE 1

| Material | Example1 | Example2 | Example3 |
|---|---|---|---|
| Fine particle emulsion | JSR 0569 | Luxstar DS-602 | Example A-1 |
| Weight Parts | 30 | 10 | 20 |
| Particle size (μm) | 0.09 | 0.09 | 0.09 |
| Tg (° C.) | –4 | –27 | –26 |
| Large particle emulsion | Example B-1 | Example B-1 | Example B-1 |
| Weight Parts | 70 | 90 | 80 |
| Particle size (μm) | 0.25 | 0.25 | 0.25 |
| Tg (° C.) | 17 | 17 | 17 |
| Estimate 1 (as composition of emulsion) | | | |
| Particle size distribution | single peak | single peak | single peak |
| Fine particle portion | non | non | non |
| Peak diameter (μm) | 0.26 | 0.26 | 0.26 |
| Stability to segmentation | stable | stable | stable |
| Film forming property (Pin-hole) | 6 | 2 | 3 |
| WVTR (g/24 hr*m-sqr) | 100 | 50 | 70 |
| WVTR after 1 Week | 70 | 40 | 50 |
| Blocking Resistance(° C.) | 40 | 40 | 40 |
| Estimate 2 (as moisture-proof coating formulation) | | | |
| Film forming property (Pin-hole) | 4 | 2 | 3 |
| WVTR (g/24 hr*m-sqr) | 25 | 20 | 22 |
| WVTR after 1 Week | 20 | 15 | 15 |
| Blocking Resistance(° C.) | 40 | 40 | 40 |

Comparative Examples 1 to 3

For comparing purpose, a series of compositions was prepared where the desired and large particle emulsion was substituted for comparative Example C-1 in the same equipments and the same method.

The result of evaluations was shown in Table 2 below.

TABLE 2

| Material | Comparative Example 1 | Comparative Example 2 | Comparative Example 3 |
|---|---|---|---|
| Fine particle emulsion | JSR 0569 | Luxstar DS-602 | Example A-1 |
| Weight Parts | 30 | 10 | 20 |
| Particle size(μm) | 0.09 | 0.09 | 0.09 |
| Tg (° C.) | –4 | –27 | –26 |
| Large particle emulsion | Example C-1 | Example C-1 | Example C-1 |
| Weight Parts | 70 | 90 | 80 |
| Particle size(μm) | 0.11 | 0.11 | 0.11 |
| Tg (° C.) | 17 | 17 | 17 |
| Estimate 1 (as composition of emulsion) | | | |
| Particle size distribution | broad peak | broad peak | broad peak |
| Fine particle portion | exist | exist | exist |
| Peak diameter(μm) | 0.11(broad) | 0.12 | 0.12 |
| Stability to segmentation | stale | stable | stable |
| Film forming property (Pin-hole) | Poor | Poor | Poor |
| WVTR (g/24 hr*m-sqr) | 300 | 350 | 550 |
| WVTR after 1 Week | 250 | 280 | 320 |
| Blocking Resistance(° C.) | 40 | 40 | 40 |
| Estimate 2 (as moisture-proof coating formulation) | | | |
| Film forming property (Pin-hole) | >50 | >50 | >50 |
| WVTR (g/24 hr*m-sqr) | 100 | 120 | 150 |
| WVTR after 1 Week | 85 | 100 | 125 |
| Blocking Resistance(° C.) | 40 | 40 | 40 |

It is obvious that the compositions of Examples 1 to 3 in this invention have a single peak in particle distribution by absorbing particles and excellent film forming property with pin-hole test and value of WVTR.

EXAMPLES 4 to 5

A series of compositions was prepared by the mixing the large particle emulsion and the fine particle emulsion shown in Table 3 in the same equipments and the same method.

The results of evaluations were shown in Table 3 below.

EXAMPLE 6

Charge D-1)

A vessel equipped with a stirrer was charged with the mixture of 62 parts of styrene, 34.5 parts of 2-ethylhexyl acrylate, 3.5 parts of methacrylic acid, 0.5 parts of sodium dodecylbenzenesulfonate and 54.9 parts of deionized water. The mixture was emulsified by stirring.

A reactor vessel equipped with a thermometer, a stirrer, a blanket nitrogen intake line, a monomer feed pump and a reflux condenser was charged with 35.6 parts of deionized water and heated to 60° C.

Then above reactor vessel was charged with 7.8 parts of Charge D-1 and 20 parts of 10% ammonium persulfate in deionized water was added and heated up to 80° C. and kept for 30 minutes.

Charge D-1 of residual was added, with stirring, for four hours while keeping inner temperature 78 to 81° C.

Three hours after, 30 parts of stable SBR latex JSR 0569 (solid content 48%, 0.09 micrometer in particle size, Tg −4° C., commercially available from Japan Synthetic Rubber Co., Ltd.) as the fine particle and improved film forming emulsion was added over 1 hour. After adding, the vessel was kept 80° C. for 3 hours, then cooled to room temperature and 1.39 parts of 25% aqueous ammonia solution was added.

The resulting emulsion polymer had 46.5% solid content, 60 mPa.s in viscosity, pH 8.3, 0.26 micrometer in particle size of a single peak.

When this emulsion was diluted to 15% solid and kept for 1 week, it had no gradient of concentration and seemed stable. The results of evaluations were shown in Table 3 below.

TABLE 3

| Material | Example 4 | Example 5 | Example 6 |
| --- | --- | --- | --- |
| Fine particle emulsion | Example A-1 | Luxstar DS-602 | |
| Weight Parts | 20 | 20 | |
| Particle size(μm) | 0.09 | 0.09 | |
| Tg (° C.) | −26 | −27 | |
| Large particle emulsion | Example B-2 | Example B-2 | Prepared by Example 6 |
| Weight Parts | 80 | 80 | |
| Particle size(μm) | 0.30 | 0.30 | |
| Tg (° C.) | 33.5 | 33.5 | |
| Estimate 1 (as composition of emulsion) | | | |
| Particle size distribution | single peak | single peak | single peak |
| Fine particle portion | non | non | non |
| Peak diameter(μm) | 0.31 | 0.31 | 0.26 |
| Stability to segmentation | stable | stable | stable |
| Film forming property (Pin-hole) | 10 | 7 | 3 |
| WVTR (g/24 hr*m-sqr) | 80 | 60 | 50 |
| WVTR after 1 Week | 70 | 50 | 40 |
| Blocking Resistance(° C.) | 50 | 50 | 50 |
| Estimate 2 (as moisture-proof coating formulation) | | | |
| Film forming property (Pin-hole) | 15 | 7 | 5 |
| WVTR (g/24 hr*m-sqr) | 30 | 25 | 20 |
| WVTR after 1 Week | 20 | 15 | 10 |
| Blocking Resistance(° C.) | 50 | 50 | 50 |

Comparative Examples 4 to 5

A series of comparative compositions was prepared by mixing emulsions listed in Table 4 in the same equipments and the same method of Example 1.

The results of evaluations were shown in Table 4 below.

Comparative Example 6

Comparative composition was prepared with substituting SBR latex to Example A-2 in the same equipment and the same method of Example 6. The results of evaluations were shown in Table 4 below.

TABLE 4

| Material | Comparative Example 4 | Comparative Example 5 | Comparative Example 6 |
| --- | --- | --- | --- |
| Fine particle emulsion | Example A-1 | Luxstar DS-602 | |
| Weight Parts | 20 | 20 | |
| Particle size(μm) | 0.09 | 0.09 | |
| Tg (° C.) | −26 | −27 | |
| Large particle emulsion | Example C-2 | Example C-2 | Prepared by comparative Example 6 |
| Weight Parts | 80 | 80 | |
| Particle size(μm) | 0.12 | 0.12 | |
| Tg (° C.) | 33.5 | 33.5 | |
| Estimate 1 (as composition of emulsion) | | | |
| Particle size distribution | broad peak | broad peak | broad peak |
| Fine particle portion | unknown | unknown | non |
| Peak diameter(μm) | 0.11(broad) | 0.12(broad) | 0.26 |
| Stability to segmentation | stable | stable | stable |
| Film forming property (Pin-hole) | poor | poor | poor |
| WVTR (g/24 hr*m-sqr) | 800 | 890 | 900 |
| WVTR after 1 Week | 350 | 350 | 400 |
| Blocking Resistance(° C.) | 50 | 50 | 50 |
| Estimate 2 (as moisture-proof coating formulation) | | | |
| Film forming property (Pin-hole) | poor | poor | poor |
| WVTR (g/24 hr*m-sqr) | 250 | 220 | 350 |
| WVTR after 1 Week | 220 | 200 | 260 |
| Blocking Resistance(° C.) | 50 | 50 | 50 |

It is clear that the compositions of examples 4 to 6 in this invention have a single peak in particle distribution by absorbing particles and excellent film forming property with pin-hole test and value of WVTR.

EXAMPLES 7 to 11

A reactor vessel equipped with a thermometer, a stirrer, an emulsion feed pump and a reflux condenser was charged with quantities of Example B-1 listed in Table 5. Stable styrene-acrylic emulsion of Example A-1 in this invention was added, with stirring, for 15 minitus at 40° C., then continued to stir for 30 minutes.

This composition was tested as the same way of Example 1.

Test result was shown in Table 5.

The test methods used in this invention are shown below.

Method of Making Coated Paper

The compositions of the present invention were coated on PPC paper(75 g/m.sqr) to form 15 g/m.sqr of dry coated-

TABLE 5

| Material | Example 7 | Example 8 | Example 9 | Example 10 | Example 11 |
|---|---|---|---|---|---|
| Fine particle emulsion | | | Example A-1 | | |
| Weight Parts | 10 | 20 | 30 | 40 | 45 |
| Particle size(μm) | | | 0.09 | | |
| Tg (° C.) | | | −26 | | |
| Large particle emulsion | | | Example B-1 | | |
| Weight Parts | 90 | 80 | 70 | 60 | 55 |
| Particle size(μm) | | | 0.25 | | |
| Tg (° C.) | | | 17 | | |
| Estimate 1 (as composition of emulsion) | | | | | |
| Particle size distribution | single peak | single peak | single peak | single peak | single peak |
| Fine particle portion | non | non | non | non | non |
| Peak diameter(μm) | 0.26 | 0.26 | 0.26 | 0.26 | 0.22 |
| Stability to segmentation | stable | stable | stable | stable | stable |
| Film forming property(Pin-hole) | 6 | 2 | 3 | 3 | 3 |
| WVTR (g/24 hr*m-sqr) | 100 | 50 | 70 | 100 | 150 |
| WVTR after 1 Week | 70 | 40 | 50 | 75 | 100 |
| Blocking Resistance(° C.) | 40 | 40 | 40 | 35 | 33 |
| Estimate 2 (as moisture-proof coating formulation) | | | | | |
| Film forming property(Pin-hole) | 4 | 2 | 3 | 3 | 3 |
| WVTR (g/24 hr*m-sqr) | 25 | 20 | 22 | 30 | 40 |
| WVTR after 1 Week | 20 | 15 | 15 | 25 | 40 |
| Blocking Resistance(° C.) | 40 | 40 | 40 | 35 | 35 |

Comparative Examples 7 to 11

A reactor vessel equipped with a thermometer, a stirrer, an emulsion feed pump and a reflux condenser was charged with quantities of Example B-1 listed in Table 6. Low Tg styrene-acrylic emulsion of Example A-2 was added, with stirring, for 15 minutes at 40° C., then continued to stir for 30 minutes.

This mixture was tested as the same way of Example 1.

Test result was shown in Table 6.

layer using coating rods. The coated-paper was dried at 130° C. for one minute.

In case of moisture-proof composition, small quantity of wax dispersion was added to the composition of the present invention or comparative examples.

Moisture-proof Coating Formulation 0.3 part of paraffin wax dispersion (Phoenix EW-500 commercially available from FUTABA FINE CHEMICAL Co., Ltd.) was added to the emulsion composition of the examples or comparative examples in this invention.

TABLE 6

| Material | Comparative Example 7 | Comparative Example 8 | Comparative Example 9 | Comparative Example 10 | Comparative Example 11 |
|---|---|---|---|---|---|
| Fine particle emulsion | | | Example A-2 | | |
| Weight Parts | 0 | 20 | 30 | 40 | 60 |
| Particle size(μm) | | | 0.20 | | |
| Tg (° C.) | | | −26 | | |
| Large particle emulsion | | | Example B-1 | | |
| Weight Parts | 100 | 80 | 70 | 60 | 40 |
| Particle size(μm) | | | 0.25 | | |
| Tg (° C.) | | | 17 | | |
| Estimate 1 (as composition of emulsion) | | | | | |
| Particle size distribution | single peak | broad peak | broad peak | broad peak | broad peak |
| Peak diameter(μm) | 0.20 | 0.24 | 0.23 | 0.22 | 0.21 |
| Stability to segmentation | stable | stable | stable | stable | stable |
| Film forming property(Pin-hole) | poor | poor | poor | >50 | 30 |
| WVTR (g/24 hr*m-sqr) | 1500 | 1000 | 700 | 300 | 150 |
| WVTR after 1 Week | 1000 | 800 | 400 | 150 | 100 |
| Blocking Resistance(° C.) | 40 | 40 | 35 | 25 | 20 |

Particle Size Distribution

Particle size distribution of emulsion and composition, was measured by a laser scattering particle size analyzer (HORIB Co., Ltd.)

Film Forming Property (Pin-hole)

Hexane was dropped on the coated paper prepared by the method mentioned above. If there were some pin-holes on the paper, hexane penetrated to paper and made spots on paper. Film forming property (Pin-hole) showed a number of spots per 25 cm.sqr of paper that depended on film forming.

In case of poor film forming, hexane spread all of paper surface and marked poor in the Table.

WVTR (Water-vapor Transmission Rate) (g/24 hr*m.sqr)

The water moisture permeability of coated paper setting on coated surface to high humidity was measured in accordance with Japanese Industrial Standard (JIS) Z0208, cup method.

The measurement usually started within 2 hours after coating, and measurement value listed in WVTR column. Also the measurement started after a week later, the measurement value of this case listed in WVTR(after 1 week) column.

Stability to Segmentation

Emulsion was diluted to 15% solid content and keeping in tube of 30 cm long for a week. The concentration of the emulsions of surface and bottom, was measured.

In case that the difference of the concentration was smaller than 0.5%, stability to segmentation was marked stable.

Blocking Resistance (° C.)

Coated paper laminate on coated surface to uncoated surface and the resultant laminate was pressed under 0.5 kg/cm.sqr and keeping in constant temperature boxes of 25 to 55° C. After 1 week, the bonding strength of the laminate was observed and evaluated max temperature easily separating from each other.

Mechanical Stability

The increase of grits after mechanical stability test by Marron Mechanical Stability Tester under 15 kg force and for 30 minutes was observed and the quantity of grits not passing through 80 mesh screen was evaluated. In case the quantity of grits on 80 mesh screen was smaller than 500 ppm, emulsion was evaluated as stable.

What is claimed is:

1. A polymer emulsion which is a mixture of a synthetic large particle polymer emulsion containing polymers having a particle size of 0.15 $\mu$m or longer in diameter and a synthetic fine particle polymer emulsion containing polymers having a particle size of 0.10 $\mu$m or shorter in diameter, wherein the glass transition temperature of the latter polymer is at least 20 degrees lower than that of the former emulsion and the particle size ratio between the former polymer and the latter polymer is 2 or more.

2. A polymer emulsion according to claim 1, wherein the content of the large particle polymer emulsion is 50% to 95% by weight and the content of the fine particle polymer emulsion is 50% to 5% by weight.

3. A polymer emulsion according to claim 1, wherein the large particle polymer emulsion comprises 40–60% of a polymer, 0.1–4% of an emulsifier and 35–58% of water, and the fine polymer emulsion comprises 30–60% of a polymer, 0.2–6% of an emulsifier and 35–68% of water.

4. A polymer emulsion according to claim 1, wherein the large particle polymer emulsion and the fine polymer emulsion are styrene-butadiene emulsion, acrylic emulsion, styrene-acrylic emulsion, vinyl chloride emulsion, vinylidene chloride emulsion or vinyl-acetate emulsion.

5. A paper coating composition for making moisture-proof coated paper and/or recyclable-coated paper, which comprises the polymer emulsion described in claim 1 and a wax.

* * * * *